United States Patent
Scheer

(10) Patent No.: US 12,066,109 B2
(45) Date of Patent: Aug. 20, 2024

(54) SEAL ASSEMBLY AND METHOD OF USING THE SAME

(71) Applicant: Steven George Scheer, Selma, AL (US)

(72) Inventor: Steven George Scheer, Selma, AL (US)

(73) Assignee: INTERNATIONAL PAPER COMPANY, Memphis, TN (US)

(*) Notice: Subject to any disclaimer, the term of this patent is extended or adjusted under 35 U.S.C. 154(b) by 0 days.

(21) Appl. No.: 17/663,525

(22) Filed: May 16, 2022

(65) Prior Publication Data
US 2024/0011565 A1 Jan. 11, 2024

Related U.S. Application Data

(63) Continuation of application No. 16/671,632, filed on Nov. 1, 2019, now Pat. No. 11,353,113.

(51) Int. Cl.
*F16J 15/3284* (2016.01)

(52) U.S. Cl.
CPC ............... *F16J 15/3284* (2013.01)

(58) Field of Classification Search
CPC ........ F16J 15/32; F16J 15/322; F16J 15/3244; F16J 15/3248; F16J 15/3252; F16J 15/3268; F16J 15/3284; F16J 15/54
See application file for complete search history.

(56) References Cited

U.S. PATENT DOCUMENTS

| | | |
|---|---|---|
| 4,659,240 A | 4/1987 | Rogus |
| 4,881,829 A | 11/1989 | Koelsch |
| 4,895,460 A * | 1/1990 | Grzina .................... F16C 33/80 |
| | | 384/480 |
| 5,827,042 A | 10/1998 | Ramsay |
| 6,210,103 B1 | 4/2001 | Ramsay |
| 7,121,551 B2 | 10/2006 | Dunford et al. |
| 8,151,465 B2 | 4/2012 | Hewitt |

* cited by examiner

*Primary Examiner* — Gilbert Y Lee
(74) *Attorney, Agent, or Firm* — Thomas W. Barnes, III

(57) ABSTRACT

A seal assembly including: a collar having an opening configured to receive a rotatable shaft, an annular member having an annular opening configured to receive the collar, and first and second end plates fixedly coupled to a respective one of the first and second end surfaces of the collar. An outer surface of the collar includes one or more helical threads. The collar has a first axial length defined between first and second end surfaces of the collar, and the annular member has a second axial length defined between first and second end surfaces of the annular member, in which the second axial length is less than the first axial length. Also provided are an assembly comprising a seal assembly in accordance with the present disclosure and a method for preventing contamination of a sealed chamber.

7 Claims, 10 Drawing Sheets

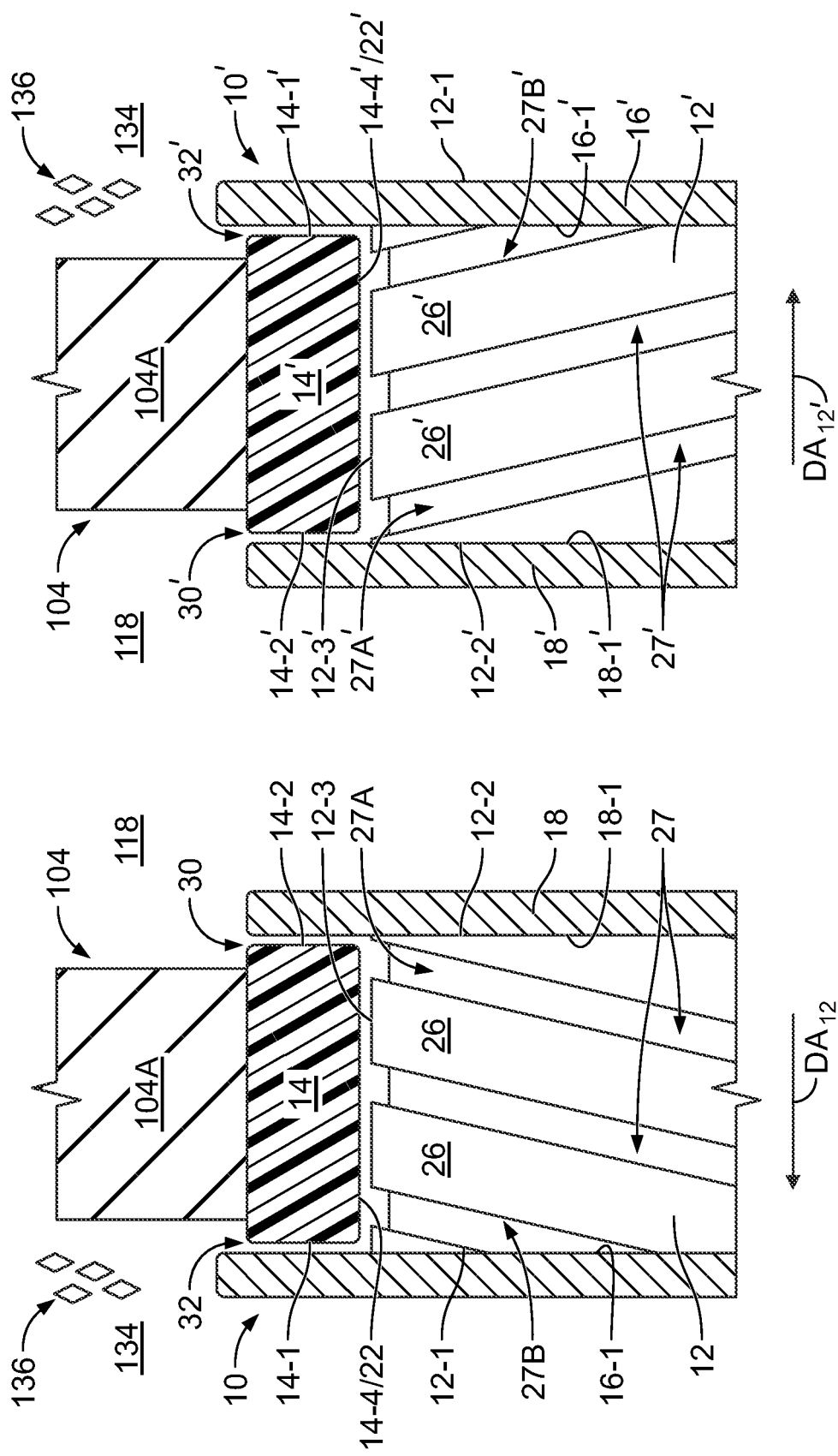

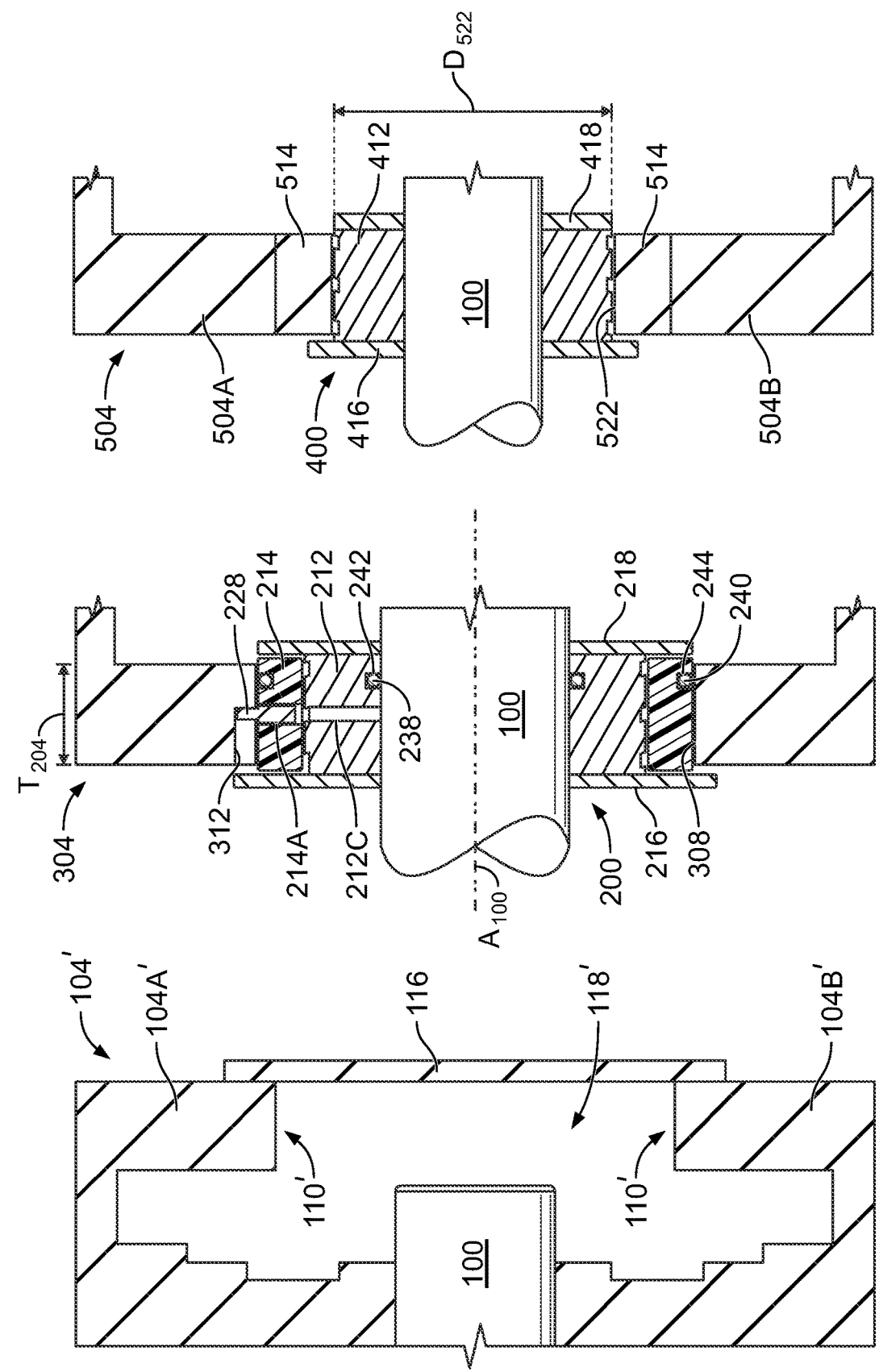

SEAL ASSEMBLY AND METHOD OF USING THE SAME

FIELD OF THE INVENTION

This invention relates generally to a seal assembly. More particularly, the invention relates to a seal assembly for use with a rotatable shaft.

BACKGROUND OF THE INVENTION

Seals may be used in various applications to seal a fluid in a bearing housing or machine frame, seal the bearing housing or machine frame against entry of contaminants, and/or remove contaminants from the bearing housing or machine frame. Sealing of a rotating shaft in a housing is an ongoing challenge, particularly in high contamination environments. To address this challenge, different strategies have been employed in the past. One strategy involves the creation of a contact seal between the seal assembly and the surface of the shaft. To create the tight fit necessary to exclude the entry of contamination, these seal assemblies typically utilize either a flexible member that contacts the shaft or magnets mounted to the shaft and the housing. Another strategy involves use of a labyrinth seal, in which a stationary piece is used with a rotating piece that, when assembled together, create an indirect path into the housing. A further strategy includes use of a pressurized barrier or flushing fluid that is forced through a seal structure to flush out and/or exclude contaminants.

These designs each suffer from a number of drawbacks. Contact seal designs depend on a close fit between the seal assembly and the shaft, which causes wear to both components, and any gaps can allow contaminants to enter, which is a particular problem for applications with high shaft deflection due to a long flexible shaft. Labyrinth seals can be overwhelmed by heavy contamination streams. Systems that rely on a barrier/flushing fluid typically require a constant supply of fluid. In configurations where the seal is utilized to contain a process fluid within the housing, the barrier/flushing fluid should be selected for compatibility with the process fluid, as the barrier/flushing fluid may be mixed with the process fluid.

SUMMARY OF THE INVENTION

In accordance with an aspect of the present disclosure, a seal assembly is provided. The seal assembly may comprise: a collar comprising an opening configured to receive a rotatable shaft, an annular member comprising an annular opening configured to receive the collar, and first and second end plates fixedly coupled to a respective one of the first and second end surfaces of the collar. The collar may comprise a first axial length defined between first and second end surfaces of the collar, and an outer surface of the collar may comprise one or more helical threads. The annular member may comprise a second axial length defined between first and second end surfaces of the annular member, in which the second axial length may be less than the first axial length.

The first and second end surfaces of the annular member may be spaced apart from an inner face of the respective first and second end plates.

The first end plate may comprise a first outer diameter and the second end plate may comprise a second outer diameter that is less than the first outer diameter. An outer diameter of the annular member may be substantially the same as the second outer diameter of the second end plate.

The one or more helical threads may comprise two or more threads defining a multi-start thread.

Each of the one or more helical threads may extend around the outer surface of the collar between the first and second end surfaces of the collar.

The first and second end plates may each comprise a plurality of apertures and the respective first and second end surfaces of the collar may each comprise a corresponding plurality of threaded bores. The first and second end plates may be fixedly coupled to the respective first and second end surfaces of the collar by a plurality of fasteners that extend through the apertures and are received in the threaded bores.

In accordance with another aspect of the present disclosure, an assembly is provided that comprises: a housing comprising a housing opening, a seal assembly received in the housing opening, and an annular member. The seal assembly may comprise: a collar comprising an opening configured to receive a rotatable shaft and first and second end plates fixedly coupled to respective first and second end surfaces of the collar. The collar may be configured to be fixedly coupled to the rotatable shaft such that the collar rotates with the rotatable shaft and axial movement of the collar relative to the rotatable shaft is prevented. An outer surface of the collar may comprise one or more helical threads. The annular member may comprise an annular opening configured to receive the collar. The annular member may be coupled to the housing such that rotational and axial movement of the annular member relative to the rotatable shaft is prevented. The one or more helical threads of the collar may be configured such that when the rotatable shaft rotates, an interaction between the outer surface of the collar and an inner surface of the annular opening creates a rotary pump comprising a first axial flow direction extending from inside the housing to outside the housing.

The annular member may further comprise: a first end surface that is spaced apart from an inner face of the first end plate to define an outlet, and a second end surface that is spaced apart from an inner face of the second end plate to define an inlet, in which when the rotatable shaft rotates, the first axial flow direction extends from the inlet toward the outlet and material is prevented from entering the housing through the outlet.

In some examples, the annular member may comprise a discrete ring. The removable ring may comprise a locator pin extending outwardly from an outer surface of the removable ring substantially perpendicular to an axis of rotation of the rotatable shaft, and the housing may comprise a notch configured to receive the locator pin to prevent the rotational movement of the removable ring relative to the rotatable shaft.

In other examples, a portion of the housing may define the annular member.

The first end plate may comprise a first outer diameter and the second end plate may comprise a second outer diameter that is less than the first outer diameter. The first outer diameter may be greater than a diameter of the housing opening.

The housing opening may comprise a first housing opening, and the seal assembly may comprise a first seal assembly. The assembly may further comprise: a second seal assembly received in a second housing opening opposite the first housing opening and a second annular member. The second seal assembly may comprise: a second collar comprising a second opening configured to receive the rotatable shaft and third and fourth end plates fixedly coupled to respective third and fourth end surfaces of the second collar. The second collar may be configured to be fixedly coupled to the rotatable shaft such that the second collar rotates with the rotatable shaft and axial movement of the second collar relative to the rotatable shaft is prevented. A second outer surface of the second collar may comprise one or more second helical threads. The second annular member may comprise a second annular opening configured to receive the second collar. The second annular member may be coupled to the housing such that rotational and axial movement of the second annular member relative to the rotatable shaft is prevented. The one or more second helical threads of the second collar may be configured such that when the rotatable shaft rotates, an interaction between the second outer surface of the second collar and an inner surface of the second annular opening creates a second rotary pump comprising a second axial flow direction extending from inside the housing to outside the housing. The second axial direction may be opposite the first axial direction.

The opening of the collar of the first seal assembly may comprise a first inner diameter, and the second opening of the second collar may comprise a second inner diameter that is different from the first inner diameter.

The one or more helical threads of the collar of the first seal assembly may comprise one of a right-handed thread or left-handed thread, and the one or more second helical threads of the second collar may comprise the other of the right-handed thread or the left-handed thread.

The second annular member may further comprise: a third end surface that is spaced apart from an inner face of the third end plate to define a second outlet, and a fourth end surface that is spaced apart from an inner face of the fourth end plate to define a second inlet, in which when the rotatable shaft rotates, the second axial flow direction extends from the second inlet toward the second outlet and the material is prevented from entering the housing through the second outlet.

In accordance with a further aspect of the present disclosure, a method for preventing contamination of a sealed chamber is provided. The method may comprise: fixedly coupling an annular rotor member to a rotatable shaft such that axial movement of the annular rotor member relative to the rotatable shaft is prevented, in which an outer surface of the annular rotor member may comprise one or more helical threads; providing an annular stator member that may be fixedly coupled to a housing such that rotational and axial movement of the annular stator member relative to the rotatable shaft is prevented; inserting the rotatable shaft into the housing such that the outer surface of the annular rotor member is adjacent to an inner surface of the annular stator member to generate the sealed chamber; and rotating the rotatable shaft. The one or more helical threads may be configured such that an interaction between the outer surface of the annular rotor member and the inner surface of the annular stator member generates a rotary pump comprising a first axial flow direction extending from inside the housing to outside the housing and prevents material from entering the sealed chamber.

The method may further comprise: fixedly coupling a second annular rotor member to the rotatable shaft such that axial movement of the second annular rotor member relative to the rotatable shaft is prevented, in which an outer surface of the second annular rotor member may comprise one or more second helical threads; and providing a second annular stator member that is fixedly coupled to the housing such that rotational and axial movement of the second annular stator member relative to the rotatable shaft is prevented. When the rotatable shaft is inserted into the housing, the outer surface of the second annular rotor member may be adjacent to an inner surface of the second annular stator member to generate the sealed chamber. The one or more second helical threads may be configured such that, when the rotatable shaft is rotated, an interaction between the outer surface of the second annular rotor member and the inner surface of the second annular stator member generates a second rotary pump that comprises a second axial flow direction extending from inside the housing to outside the housing and prevents the material from entering the sealed chamber. The second axial flow direction may be opposite the first axial flow direction.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIGS. 8A and 8B are detailed views of a portion of the bearing assembly of FIG. 7;

FIG. 9 is a cross-sectional, schematic view of a portion of another bearing assembly in accordance with the present disclosure;

FIG. 10 is a cross-sectional, schematic view of a portion of a further bearing assembly in accordance with the present disclosure;

FIG. 11 is a cross-sectional, schematic view of a portion of a further bearing assembly in accordance with the present disclosure;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present description is directed to seal assemblies and methods for use thereof to control and prevent contaminant ingression into a bearing housing or machine frame. A seal assembly in accordance with the present disclosure works to actively expel contaminants that may be attempting to enter the housing from outside and further expel contaminants within the housing that may be entering the seal assembly. The seal assembly is coupled to a rotatable shaft and utilizes energy from the rotation of the shaft to create a rotary pump causing materials such as contaminants, fluids, etc. to move in an axial flow direction extending from inside the housing to outside the housing, thereby excluding and/or expelling contamination. Seal assemblies in accordance with the present disclosure may be particularly useful in high contamination environments, such as paper mills.

Figure 1:
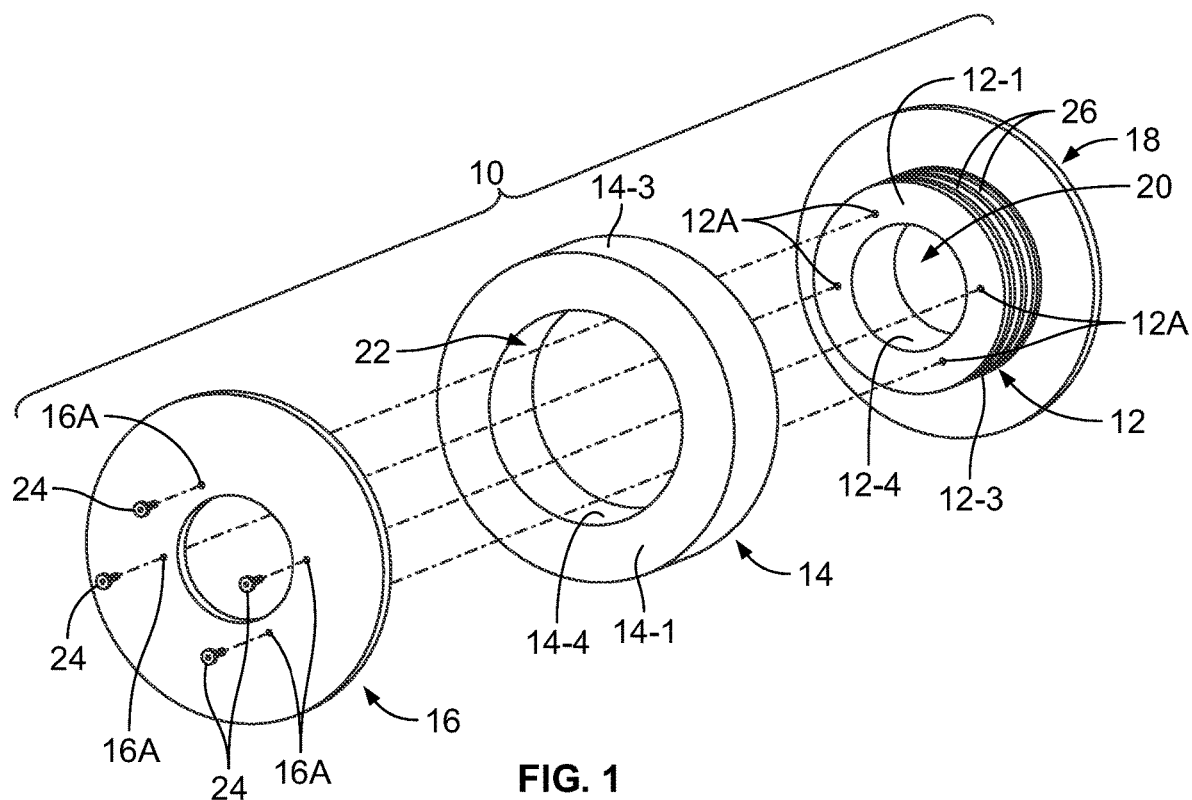
FIG. 1 is a partially exploded view of a seal assembly in accordance with the present disclosure.
Figure 2:
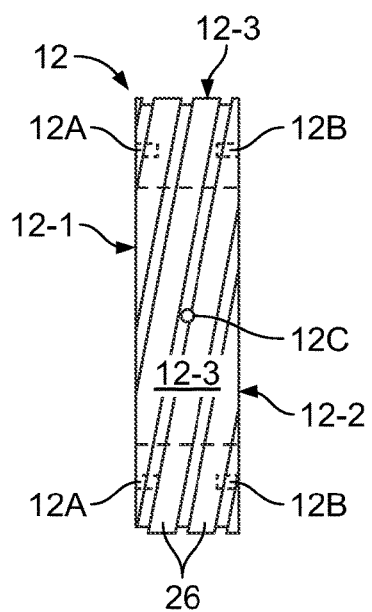
FIG. 2 is a side view of a collar of the seal assembly of FIG. 1.
Figure 3:
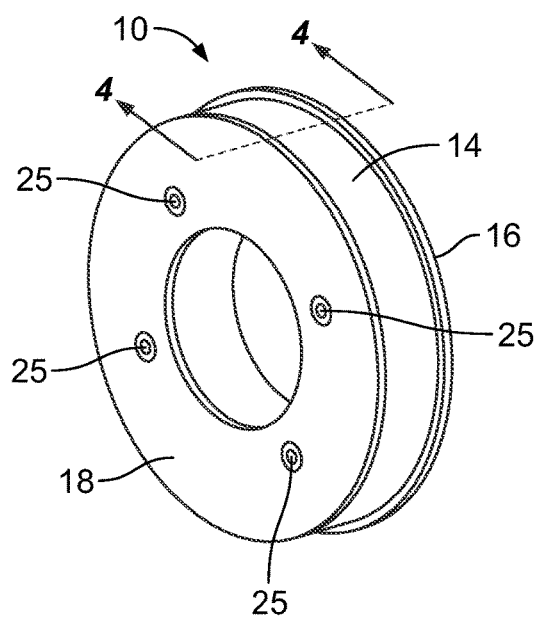
FIG. 3 is a perspective view of the seal assembly of FIG. 1 following assembly.
Figure 4:
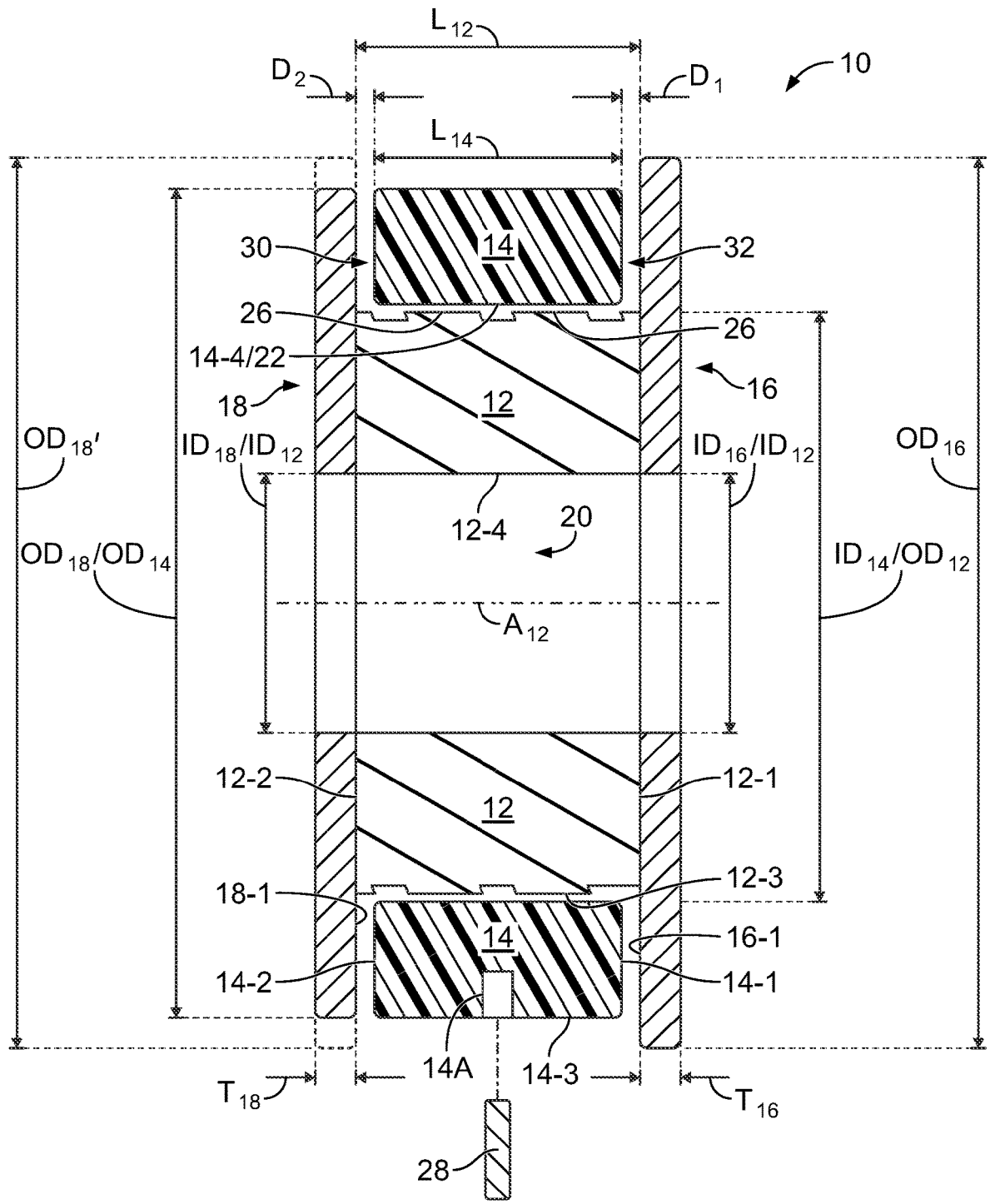
FIG. 4 is a cross-sectional view of the seal assembly of FIG. 3 taken along line 4-4.

With reference to FIGS. 1-4 and 6, a seal assembly 10 is shown, in which the seal assembly 10 may be used to seal a rotatable shaft 100 in a housing 104. Spacing between the components of the seal assembly 10 in FIG. 4 is exaggerated to illustrate aspects of the structure in detail. The seal assembly 10 may comprise a collar 12, an annular member 14, a first end plate 16, and a second end plate 18. The collar 12 (also referred to herein as a first annular rotor member) comprises first and second end surfaces 12-1 and 12-2, an outer circumferential surface 12-3, and an inner surface 12-4. The inner surface 12-4 of the collar 12 defines an opening 20 that receives the shaft 100, as described herein. The outer surface 12-3 defines an outer diameter $OD_{12}$ of the collar 12, and the inner surface 12-4 defines an inner diameter $ID_{12}$ of the collar 12, in which the inner diameter $ID_{12}$ of the collar 12 defines a diameter (not separately labeled) of the opening 20. With reference to FIGS. 2 and 4, the collar 12 may comprise an axial length $L_{12}$ defined between the first and second end surfaces 12-1 and 12-2, in which the axial length $L_{12}$ is measured in a direction substantially parallel to an axis of rotation $A_{12}$ of the collar 12. The collar 12 may be substantially cylindrical, with the inner and outer diameters $ID_{12}$ and $OD_{12}$ being substantially the same along an entirety of the axial length $L_{12}$ of the collar 12.

The annular member 14 (also referred to herein as a first annular stator member) may comprise a separate or discrete ring, as shown in FIGS. 1 and 4, or may be defined by a portion of the housing 104, as described herein in more detail with respect to FIG. 11. With reference to FIGS. 1 and 4, the annular member 14 comprises first and second end surfaces 14-1 and 14-2, an outer surface 14-3, and an inner surface 14-4. The inner surface 14-4 of the annular member 14 defines an annular opening 22 that receives the collar 12, as described herein. The outer surface 14-3 of the annular member 14 defines an outer diameter $OD_{14}$ of the annular member 14, and the inner surface 14-4 defines an inner diameter $ID_{14}$ of the annular member 14, in which the inner diameter $ID_{14}$ of the annular member 14 defines a diameter (not separately labeled) of the annular opening 22. As shown in FIG. 4, the annular member 14 may comprise an axial length $L_{14}$ defined between first and second end surfaces 14-1 and 14-2 of the annular member 14, in which the axial length $L_{14}$ is measured in a direction substantially parallel to an axis of rotation $A_{12}$ of the collar 12. The annular member 14 may be substantially cylindrical, with the inner and outer diameters $ID_{14}$ and $OD_{14}$ being substantially the same along an entirety of the axial length $L_{14}$ of the annular member 14.

The annular opening 22 of the annular member 14 may be configured to receive the collar 12. In some examples, the inner diameter $ID_{14}$ of the annular member 14 may be slightly greater than the outer diameter $OD_{12}$ of the collar 12, as best seen in FIG. 4. In some particular examples, the inner diameter $ID_{14}$ of the annular member 14 may be about 4.260 inches, and the outer diameter $OD_{12}$ of the collar 12 may be about 4.250 inches. This small amount of clearance between the inner surface 14-4 of the annular member 14 and the outer surface 12-3 of the collar 12 helps to prevent or minimize contact between the collar 12 and the annular member 14 and allows the collar 12 to rotate freely with respect to the annular member 14, as described herein in detail. The axial length $L_{14}$ of the annular member 14 may be less than the axial length $L_{12}$ of the collar 12, as shown in FIG. 4. In some particular examples, the axial length $L_{14}$ of the annular member 14 may be 0.9375 inches, and the axial length $L_{12}$ of the collar 12 may be 1.000 inches.

The first and second end plates 16 and 18 may be fixedly coupled to the collar 12. For example, with reference to FIGS. 1, 2, and 4, the first end plate 16 may comprise a plurality of apertures 16A formed through a thickness $T_{16}$ of the first end plate 16, and the first end surface 12-1 of the collar 12 may comprise a corresponding plurality of threaded bores 12A. Fasteners 24 may extend through the apertures 16A formed in the first end plate 16 and may be received in the threaded bores 12A formed in the first end surface 12-1 of the collar 12 to secure the first end plate 16 to the first end surface 12-1 of the collar 12. With reference to FIGS. 2-4, the second end plate 18 may comprise a plurality of apertures (not visible) formed through a thickness $T_{18}$ of the second end plate 18, and the second end surface 12-2 of the collar 12 may comprise a corresponding plurality of threaded bores 12B. The second end plate 18 may be similarly secured to the second end surface 12-2 of the collar 12 by inserting fasteners 25 through the apertures formed in the second end plate 18 and into the threaded bores 12B formed in the second end surface 12-2 of the collar 12. The fasteners 24 and 25 may comprise screws, bolts, or any other suitable type of fastener.

The collar 12, the annular member 14, and the end plates 16 and 18 may be made from any suitable material and may comprise, for example, a metal or metal alloy (e.g., bronze, steel, aluminum, etc.) or an engineering plastic or other hard plastic such as polyamides (e.g., nylon), polyimides, polycarbonates, etc. In one particular example, the collar 12 may comprise bronze, the annular member 14 may comprise nylon, and the end plates 16 and 18 may comprise aluminum.

As shown in FIG. 4, because the axial length $L_{14}$ of the annular member 14 is less than the axial length Lie of the collar 12, the first end surface 14-1 of the annular member 14 may be spaced apart from an inner face 16-1 of the first end plate 16 by a first distance $D_1$, and the second end surface 14-2 of the annular member 14 may be spaced apart from an inner face 18-1 of the second end plate 18 by a second distance $D_2$, when the first and second end plates 16 and 18 are coupled to the collar 12 (see also FIG. 8A). In some examples, the first and second distances $D_1$ and $D_2$ may be substantially the same.

With continued reference to FIG. 4, the first end plate 16 may comprise a first outer diameter $OD_{16}$. In some examples, the second end plate 18 may comprise a second outer diameter $OD_{18}$ that is less than the first outer diameter $OD_{16}$ of the first end plate 16, and the outer diameter $OD_{14}$ of the annular member 14 may be substantially the same as the second outer diameter $OD_{18}$ of the second end plate 18. In some particular examples, the first outer diameter $OD_{16}$ of the first end plate 16 may be about 5.375 inches, and the outer diameter $OD_{14}$ of the annular member 14 and the second outer diameter $OD_{18}$ of the second end plate 18 may both be about 5.235 inches. In other examples, the second end plate 18 may comprise a second outer diameter $OD_{18'}$ that is substantially the same as the first outer diameter $OD_{16}$ of the first end plate 16, e.g., about 5.375 inches as shown with dashed lines in FIG. 4.

Figure 7:
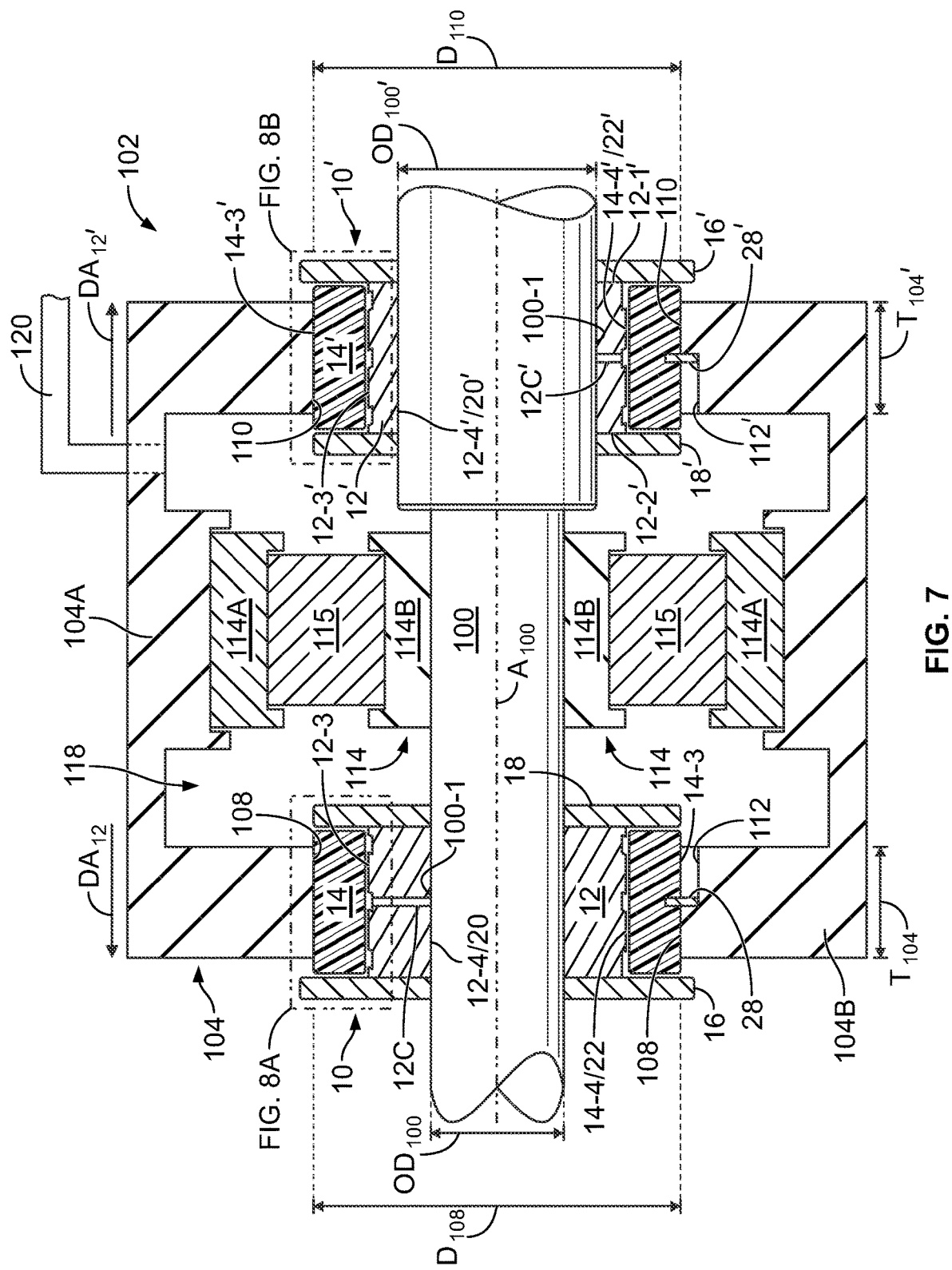
FIG. 7 is a cross-sectional, schematic view of the bearing assembly of FIG. 6 taken along line 7-7.

With reference to FIGS. 1, 4, and 7, the opening 20 of the collar 12 may be configured to receive a rotatable shaft 100. For example, the inner diameter $ID_{12}$ of the collar 12 may be slightly larger than an outer diameter $OD_{100}$ of the shaft 100, such that the opening of the collar 12 receives the shaft 100. The first and second end plates 16 and 18 may each comprise a respective inner diameter $ID_{16}$ and $ID_{18}$ that may be substantially the same as the inner diameter $ID_{12}$ of the collar 12. In some particular examples, the inner diameters $ID_{12}$, $ID_{16}$, and $ID_{18}$ of each of the collar 12 and the end plates 16 and 18 may be about 2.470 inches.

The collar 12 may be configured to be fixedly coupled to the rotatable shaft 100 such that the collar 12 rotates with the shaft 100. With reference to FIGS. 2 and 7, the collar 12 may comprise one or more threaded apertures 12C extending from the outer surface 12-3 of the collar 12 to the inner surface 12-4. Set screws (not shown) may be received in the threaded apertures 12C and may contact or engage an outer surface 100-1 of the shaft 100 with sufficient force to fix the collar 12 to the shaft 100 via friction. Coupling of the collar 12 to the shaft 100 also prevents axial movement of the collar 12 with respect to the shaft 100, i.e., movement of the collar 12 in a direction substantially parallel to the axis of rotation $A_{100}$ of the shaft 100. The shaft 100 may be coupled to a motor (not shown) or other primary driver that causes the shaft 100 to rotate about an axis of rotation $A_{100}$.

With reference to FIGS. 1, 2, and 4, the collar 12 comprises one or more helical threads 26 extending around the outer surface 12-3 of the collar 12, e.g., around an outer circumference of the collar 12. The inner surface 12-4 of the collar 12 and the outer and inner surfaces 14-3 and 14-4 of the annular member 14 may be substantially smooth, i.e., non-threaded. Each of the one or more helical threads 26 may extend around the outer surface 12-3 of the collar 12 between the first and second end surfaces 12-1 and 12-2 of the collar 12. In some examples, the one or more helical threads 26 may comprise a single thread that extends circumferentially about the collar 12 from the first end surface 12-1 of the collar 12 to the second end surface 12-2 of the collar 12. In other examples, the one or more helical threads 26 may comprise two or more threads that define a multi-start thread. In some particular examples, the helical threads 26 may comprise a triple start Acme thread having a pitch (distance, measured axially, from a point on one thread to a corresponding point on an adjacent thread) equal to 1 inch (i.e., 1 TPI), a thread depth (from crest to root) of ⅛ inch, and a thread width of ⅛ inch. In other particular examples, the one or more helical threads 26 may comprise a square thread form, as shown in FIGS. 2 and 4. One or more properties of the one or more helical threads 26, e.g., the pitch, depth, etc., may be varied to obtain, for example, a desired number of revolutions around the outer circumference of the collar 12, a desired flow rate of a rotary pump generated by the seal assembly 10, etc. In general, the one or more helical threads 26 may be configured such that each thread 26 extends at least once around an entirety of the outer circumference of the collar 12.

Figure 5:
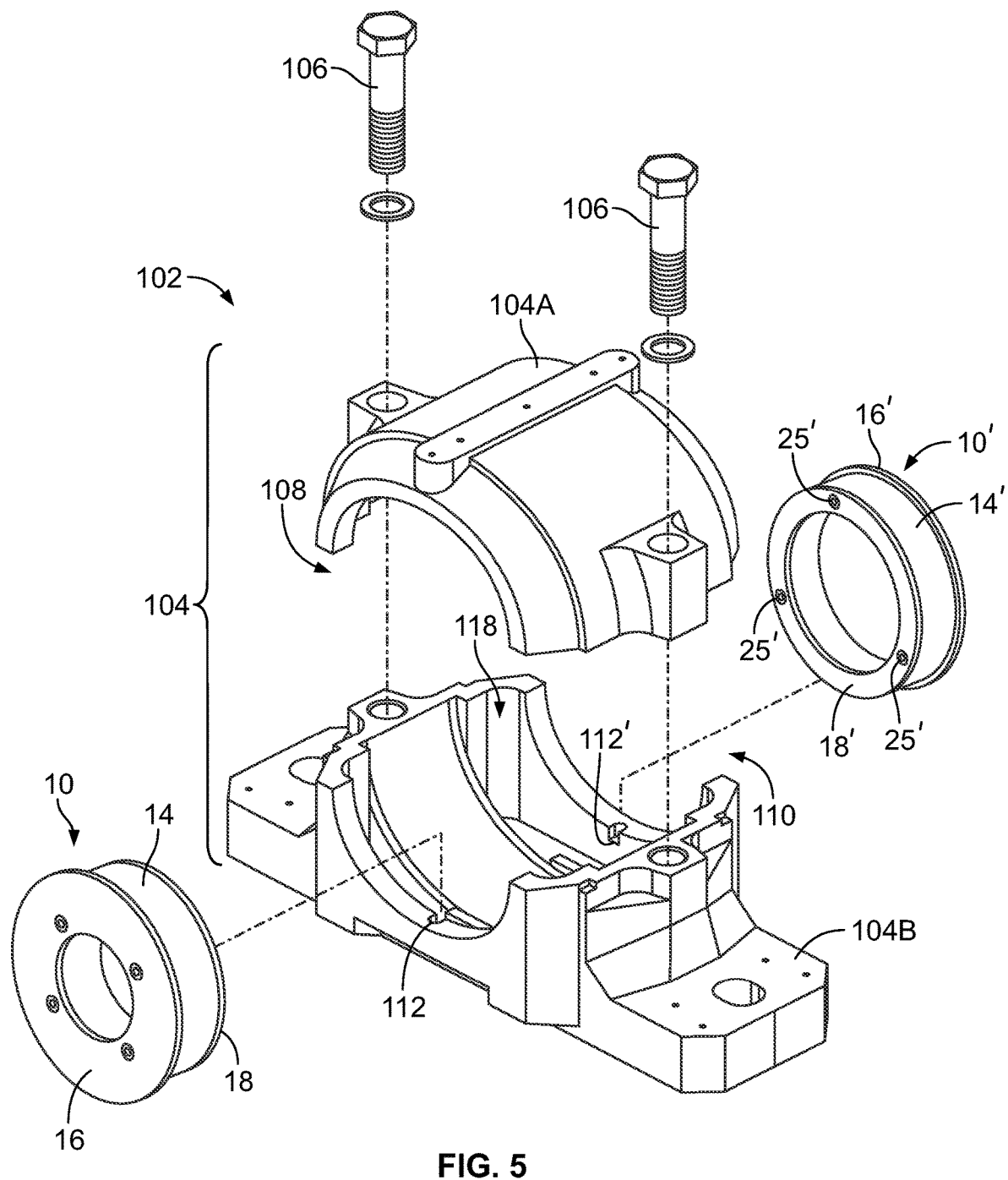
FIG. 5 is an exploded view of a bearing assembly comprising two seal assemblies in accordance with the present disclosure, in which the bearing is removed.
Figure 6:
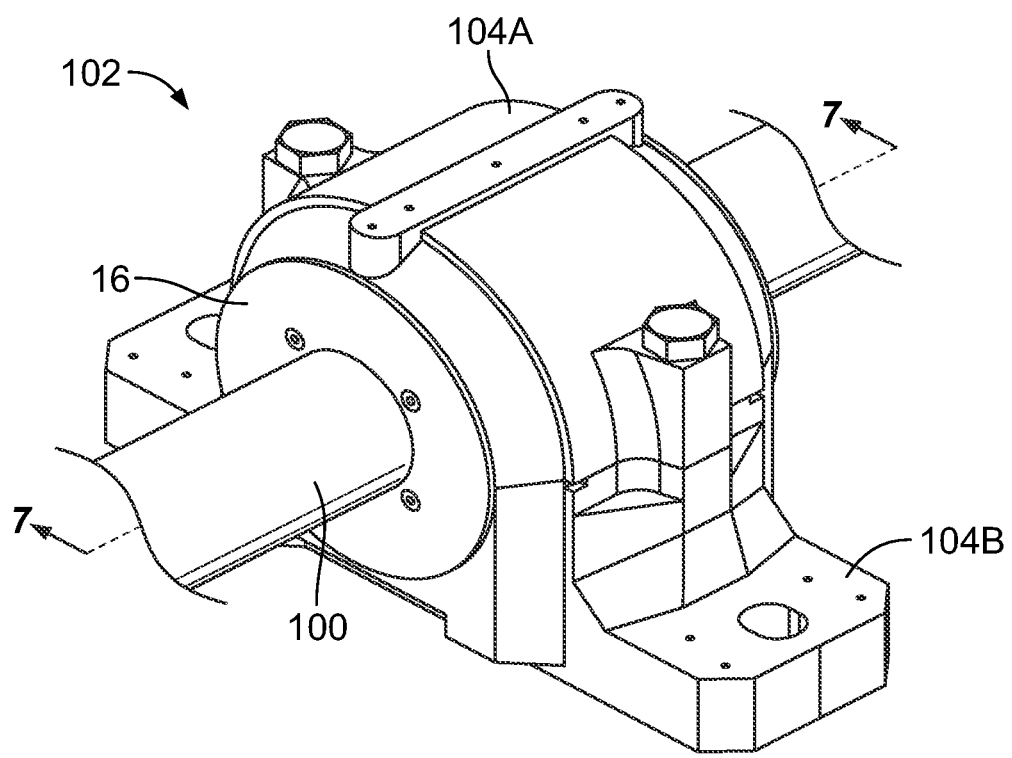
FIG. 6 is a perspective view of the bearing assembly of FIG. 5 following assembly.

The seal assembly 10 may be used as part of an assembly 102 to seal a housing 104 that forms a part of the assembly 102. In some examples, as shown in FIGS. 5-7, the assembly 102 further comprises a bearing assembly 114 mounted within the housing 104, which is also referred to herein as a bearing housing. The assembly 102 may comprise, for example, a two-piece or split pillow block bearing assembly in which the housing 104 may comprise an upper portion 104A and a lower portion 104B that may be joined together by fasteners 106, which may comprise threaded bolts or other suitable fasteners. The bearing assembly 114 (not shown in FIG. 5) supports the rotatable shaft 100 and allows the shaft 100 to rotate relative to the housing 104. The bearing assembly 114 may comprise, for example, an outer race 114A fixed to an inner portion of the bearing housing 104, an inner race 114B coupled to the shaft 100 to rotate with the shaft 100, and a plurality of rollers or balls 115 located between the outer and inner races 114A and 114B. Each of the outer and inner races 114A and 114B may comprise two split sections (not labeled), such that a first outer race section is fixed to the upper portion 104A of the housing 104 and a second outer race section is fixed to the lower portion 104B of the housing 104. The bearing assembly 114 may comprise, for example, the bearing assembly disclosed in U.S. Pat. No. 4,881,829, the disclosure of which is incorporated herein by reference, or any other conventional shaft supporting bearing assembly. In other examples, the seal assembly 10 may be used in a different type of sealed housing 104, such as a machine or equipment housing, e.g., a gearbox housing, a pump power frame, or a motor frame.

As shown in FIGS. 5 and 7, when the upper and lower portions 104A and 104B of the housing 104 are joined together, the housing 104 may define a first housing opening 108 and a second housing opening 110, in which the second housing opening 110 may be opposite the first housing opening 108. In the example shown in FIGS. 5 and 7, the shaft 100 extends through both housing openings 108 and 110. A first seal assembly, e.g., seal assembly 10, may be received in the first housing opening 108, and a second seal assembly, e.g., seal assembly 10', may be received in the second housing opening 110. As shown in FIG. 9, in other examples, the shaft 100 may extend through only one of the housing openings (not visible), and the housing 104' may comprise a cover plate 116 that extends between the upper and lower portions 104A' and 104B' and across the other housing opening 110' to seal the housing 104'. The cover plate 116 may be secured to the housing 104' by one or more fasteners (not shown). In FIGS. 7 and 9, a sealed chamber 118 and 118' may be created within the respective housing 104 and 104' by the upper and lower portions 104A/104A' and 104B/104B' of the housing 104/104', the first seal assembly 10, and either the second seal assembly 10' or the cover plate 116. In further examples (not shown), the housing may comprise only a single opening, such as when the housing comprises a machine or equipment housing. As shown in FIG. 7, an internal fluid, e.g., grease, oil, and/or other lubricant(s), may be supplied from a fluid supply (not shown) to the sealed chamber 118 via a conduit 120. The fluid may at least partially fill the sealed chamber 118 and may flow through the bearing assembly 114 and/or around the shaft 100.

The first seal assembly 10 depicted in FIGS. 5 and 7 may be substantially similar to the seal assembly 10 depicted in FIGS. 1-4. With reference to FIGS. 4 and 7, the outer diameter $OD_{14}$ of the annular member 14 and the outer diameter $OD_{18}$ of the second end plate 18 may be slightly less than a diameter $D_{108}$ of the first housing opening 108, such that the annular member 14 and the second end plate 18 may be received in the first housing opening 108. The outer diameter $OD_{16}$ of the first end plate 16 may be greater than the diameter $D_{108}$ of the first housing opening 108, such that the first end plate 16 is unable to be received in the first housing opening 108.

The second seal assembly 10' shown in FIG. 7 may comprise a second collar 12', a second annular member 14', and third and fourth end plates 16' and 18'. The second collar 12' (also referred to herein as a second annular rotor member) may comprise third and fourth end surfaces 12-1' and 12-2', a second outer surface 12-3', and a second inner surface 12-4'. The second inner surface 12-4' of the second collar 12' defines a second opening 20' that receives the shaft 100. The second outer surface 12-3' defines a second outer diameter (not labeled) of the second collar 12', and the second inner surface 12-4' defines a second inner diameter (not labeled) of the second collar 12', in which the second inner diameter of the second collar 12' defines a diameter (not labeled) of the second opening 20'. Similar to the collar 12, the second collar 12' may comprise an axial length (not labeled) defined between the third and fourth end surfaces 12-1' and 12-2', and the second collar 12' may be substantially cylindrical, with the second inner and outer diameters of the second collar 12' being substantially the same along an entirety of the axial length of the second collar 12'. The third and fourth end plates 16' and 18' may be fixedly coupled to the second collar 12'. In particular, as described in detail with respect to the first and second end plates 16 and 18 of the first seal assembly 10, the third and fourth end plates 16' and 18' may be fixedly coupled to respective ones of the third and fourth end surfaces 12-1' and 12-2' of the second collar 12' via a plurality of fasteners, as shown in FIGS. 5 and 7 (only the fasteners 25' for the fourth end plate 18' are visible).

The second annular member 14' (also referred to herein as a second annular stator member) of the second seal assembly 10' may comprise a separate or discrete ring, as shown in FIGS. 7 and 8B, or may be defined by a portion of the housing 104, as described herein with respect to FIG. 11. As described herein with respect to the annular member 14, the second annular member 14' may comprise third and fourth end surfaces 14-1' and 14-2', a second outer surface 14-3', and a second inner surface 14-4'. The second inner surface 14-4' of the second annular member 14' defines a second annular opening 22' that receives the second collar 12'. The second outer surface 14-3' of the second annular member 14' defines a second outer diameter (not labeled) of the second annular member 14', and the second inner surface 14-4' defines a second inner diameter (not labeled) of the second annular member 14', in which the second inner diameter of the second annular member 14' defines a diameter (not labeled) of the second annular opening 22'. Similar to the annular member 14, the second annular member 14' may comprise an axial length (not labeled) defined between the third and fourth end surfaces 14-1' and 14-2', in which the axial length of the second annular member 14' may be less than the axial length of the second collar 12'. The second annular member 14' may be substantially cylindrical, with the inner and outer diameters of the second annular member 14' being substantially the same along an entirety of the axial length of the second annular member 14'. As described herein with respect to the annular member 14, the second annular opening 22' of the second annular member 14' may similarly be configured to receive the second collar 12'.

As shown in FIGS. 7 and 8B, because the axial length of the second annular member 14' is less than the axial length of the second collar 12', the third and fourth end surfaces 14-1' and 14-2' of the second annular member 14' may be spaced apart from respective inner faces 16-1' and 18-1' of the third and fourth end plates 16' and 18', as described herein in detail with respect to the first seal assembly 10. Also as described in detail with respect to the first seal assembly 10, the third end plate 16' may comprise a third outer diameter (not labeled), and the fourth end plate 18' may comprise a fourth outer diameter (not labeled), in which the fourth outer diameter may be the same as, or less than, the third outer diameter of the third end plate 16'. The second outer diameter of the second annular member 14' may be substantially the same as the fourth outer diameter of the fourth end plate 18', as shown in FIG. 7.

Similar to the opening 20 of the collar 12, the second opening 20' of the second collar 12' may be configured to receive the rotatable shaft 100, as shown in FIG. 7. In some examples, the second inner diameter of the second collar 12' may be different from the inner diameter $ID_{12}$ of the collar 12 of the first seal assembly 10. For instance, with reference to FIGS. 5 and 7, the shaft 100 may increase from a first outer diameter $OD_{100}$ to a second outer diameter $OD_{100'}$ within the housing 104, such that the second inner diameter of the second collar 12' is greater than the inner diameter $ID_{12}$ of the collar 12. In other examples, the outer diameter $OD_{100}$ of the shaft 100 may be substantially uniform (shown with dashed lines in FIG. 7), such that the inner diameter $ID_{12}$ of the collar 12 is substantially the same as the second inner diameter of the second collar 12'. Inner diameters (not labeled) of the third and fourth end plates 16' and 18' may be substantially the same as the second inner diameter of the second collar 12'.

As described in detail with respect to the first seal assembly 10, the respective outer diameters of the second annular member 14' and the fourth end plate 18' may be slightly less than a diameter $D_{110}$ of the second housing opening 110, such that the second annular member 14' and the fourth end plate 18' may be received in the second housing opening 110. An outer diameter (not labeled) of the third end plate 16' may be greater than the diameter $D_{110}$ of the second housing opening 110, such that the third end plate 16' is unable to be received in the second housing opening 110. In some examples, the diameter $D_{110}$ of the second housing opening 110 may be substantially the same as the diameter $D_{108}$ of the first housing opening 108, such that the outer diameters of the second annular member 14' and fourth end plate 18' of the second seal assembly 10' are substantially the same as the outer diameters $OD_{14}$ and OD 18 of the annular member 14 and the second end plate 18 of the first seal assembly 10, as shown in FIGS. 5 and 7. In other examples (not shown), the diameter $D_{110}$ of the second housing opening 110 may be different from the diameter $D_{108}$ of the first housing opening 108.

The second collar 12' may be configured to be fixedly coupled to the rotatable shaft 100 such that the second collar 12' rotates with the shaft 100. For example, as shown in FIG. 7, the second collar 12' may comprise one or more threaded apertures 12C' that extend from the second outer surface 12-3' of the second collar 12' to the second inner surface 12-4' and receive set screws (not shown) that fix the second collar 12' to the shaft 100, as described in more detail with respect to the collar 12 of the first seal assembly 10. Coupling of the second collar 12' to the shaft 100 also prevents axial movement of the second collar 12' with respect to the shaft 100. The second outer surface 12-3' of the second collar 12' may comprise one or more second helical threads 26' that may be substantially similar to the one or more threads 26 of the collar 12 and may extend around the second outer surface 12-3' between the third and fourth end surfaces 12-1' and 12-2' of the second collar 12'. The second inner surface 12-4' of the second collar 12' and the second outer and inner surfaces 14-3' and 14-4' of the second annular member 14' may be substantially smooth, i.e., non-threaded.

As shown in FIG. 7, the annular members 14 and 14' may comprise the only portion of each seal assembly 10 and 10' that contacts the housing 104. In some examples, with reference to FIGS. 4 and 7, the axial length $L_{14}$ of the annular member 14 may be greater than a thickness $T_{104}$ of the adjacent section of the housing 104. The axial length of the second annular member 14' may similarly be greater than a thickness $T_{104'}$ of the adjacent section of the housing 104.

The annular members 14 and 14' may be coupled to the housing 104 such that rotational and axial movement of each annular member 14 and 14' relative to the rotatable shaft 100 and/or the housing 104 is prevented. For example, as shown in FIGS. 4, 5, and 7, when the annular member 14 comprises a discrete ring, the annular member 14 may comprise a bore 14A that receives a locator pin 28 extending outwardly from the outer surface 14-3 of the annular member 14 substantially perpendicular to the axis of rotation $A_{100}$ of the rotatable shaft 100. As shown in FIGS. 5 and 7, the second annular member 14' may similarly comprise a second locator pin 28'. The bores 14A and locator pins 28 and 28' may be threaded, or the locator pins 28 and 28' may engage the bores 14A via a friction fit. In some examples, the locator pins 28 and 28' may comprise a roll pin. The housing 104 may comprise notches 112 and 112' configured to receive a respective one of the locator pins 28 and 28'. The notches 112 and 112' may be formed in any portion of the housing 104. In the example shown in FIGS. 5 and 7, the notches 112 and 112' are formed in a section of the lower portion 104B of the housing 104. The notches 112 and 112' may extend axially from inside the housing 104 toward the outside and may extend only partially through a respective thickness $T_{104}$ and $T_{104'}$ of the housing 104 and further have a width (not labeled) in a circumferential direction equal to or only slightly larger than a diameter of the pins 28 and 28' so as to prevent the pins 28 and 28' from moving circumferentially relative to the housing 104. When the annular members 14 and 14' are received in the respective housing opening 108 and 110, the locator pins 28 and 28' are inserted into the respect notches 112 and 112', such that engagement between the locator pins 28 and 28' and the notches 112 and 112' prevents rotational movement of the annular members 14 and 14' relative to the rotatable shaft 100 and the housing 104.

As shown in FIGS. 4 and 7, when the seal assemblies 10 and 10' are assembled, the collars 12 and 12' are fixedly coupled to the shaft 100, and the end plates 16, 18 and 16', 18' are fixedly coupled to the respective collars 12 and 12'. The annular members 14 and 14' are then sandwiched between the respective pairs of end plates 16, 18 and 16', 18', which prevents axial movement of the annular members 14 and 14' relative to the rotatable shaft 100. Engagement between the locator pins 28 and 28' and the respective notches 112 and 112' may also prevent axial movement of the annular members 14 and 14' relative to the shaft 100 and the housing 104, e.g., in a direction extending away from the housing 104 as indicated by arrows $DA_{12}$ and $DA_{12'}$.

Alternatively, or in addition, rotational and/or axial movement of the annular members 14 and 14' may be prevented, at least in part, by a friction fit between the outer surfaces 14-3 and 14-3' of the annular members 14 and 14' and inner surfaces of the respective housing openings 108 and 110. For example, in some configurations, the outer diameter $OD_{14}$ of the annular member 14 may be slightly greater than the diameter $D_{108}$ of the first housing opening 108, such that when the annular member 14 is received in the first housing opening 108 and the upper and lower portions 104A and 104B of the housing 104 are closed around the annular member 14, the housing 104 may engage the outer surface 14-3 of the annular member 14 by a friction fit. The outer diameter of the second annular member 14' may similarly be slightly greater than the diameter $D_{110}$ of the second housing opening 110 such that the housing 104 may engage the second outer surface 14-3' of the second annular member 14' by a friction fit when the second annular member 14' is received in the second housing opening 110. In some examples, the housing 104 may slightly compress the annular members 14 and 14'. In one particular example, the diameters $D_{108}$ and $D_{110}$ of the respective housing openings 108 and 110 may be 5.250 inches, and the outer diameters $OD_{14}$ of the respective annular members 14 and 14' may be about 5.255 inches. In this particular example, the outer diameters $OD_{18}$ of the second and fourth end plates 18 and 18' may be slightly less than (e.g., about 5.235 inches) the outer diameters $OD_{14}$ of the respective annular members 14 and 14' and the diameters $D_{108}$ and $D_{110}$ of the respective housing openings 108 and 110 so that the second and fourth end plates 18 and 18' are able to pass through the respective housing openings 108 and 110.

In another example configuration, as shown in FIG. 10, a seal assembly 200 may comprise an annular member 214 in the form of a discrete ring comprising a threaded aperture 214A that receives a locator pin 228. The locator pin 228 may comprise, for example, a pipe plug. One portion of the pipe plug 228 may be threaded and may be received in the aperture 214A. Another portion of the pipe plug 228 may extend outwardly from an outer surface (not labeled) of the annular member 214 substantially perpendicular to an axis of rotation $A_{100}$ of a rotatable shaft 100. A housing 304 may comprise a notch 312 configured to receive the portion of the pipe plug 228 that extends outward from the annular member 214. The notch 312 may be formed in any portion of the housing 304 and may extend partially through a thickness $T_{304}$ of the housing 304 in an axial direction extending from outside the housing 304 toward the inside. In some examples, the housing 304 may comprise a two-part or split housing with upper and lower portions (not labeled) as described herein in detail, and in other examples, the housing 304 may comprise a single part.

As described herein in detail with respect to the locator pins 28 and 28' in FIG. 7, when the annular member 214 with the locator pin 228 is received in a housing opening 308, engagement between the locator pin 228 and the notch 312 prevents rotational movement relative to the rotatable shaft 100 and/or the housing 304. Engagement between the locator pin 228 and the notch 312 may also prevent axial movement of the annular member 214, e.g., in a direction extending toward the housing 304. Also as described herein in detail with respect to the annular members 14 and 14' in FIG. 7, the rotational and/or axial movement of the annular member 214 relative to the rotatable shaft 100 and/or the housing 304 may be prevented, at least in part, by a friction fit between the outer surface of the annular member 214 and the housing opening 308 in which the seal assembly 200 is received. The seal assembly 200 may be used in conjunction with a second seal assembly, as shown in FIG. 7, or with a cover plate, as shown in FIG. 9, in which the second seal assembly may comprise any of the seal assemblies described herein.

In the example shown in FIG. 10, the seal assembly 200 may further comprise a collar 212 and a pair of end plates 216 and 218. The collar 212 may be fixedly coupled to the rotatable shaft 100, as described herein in detail with respect to the collars 12 and 12' in FIG. 7. For example, the collar 212 may comprise one or more threaded apertures 212C that extend from an outer surface (not labeled) to an inner surface (not labeled) of the collar 212 and receive set screws (not shown) that fix the collar 212 to the shaft 100, as described herein. Coupling of the collar 212 to the shaft 100 allows the collar 212 to rotate with the shaft 100 and also prevents axial movement of the collar 212 with respect to the shaft 100. The aperture 214A formed in the annular member 214 may further serve as an access point for removal of the set screws, as described below.

With continued reference to FIG. 10, the seal assembly 200 may optionally comprise one or more additional O-ring seals 238 and 240. For example, the collar 212 may comprise an inner groove 242 that extends circumferentially around the inner surface of the collar 212 and may be configured to receive a first O-ring seal 238. The annular member 214 may comprise an outer groove 244 that extends circumferentially around the outer surface of the annular member 214 and may be configured to receive a second O-ring seal 240. The O-ring seals 238 and 240 may help to further seal the housing 204 and prevent entry of material into the housing 204 between the shaft 100 and the collar 212 and/or between the annular member 214 and the housing opening 308, as described below.

In a further configuration, as shown in FIG. 11, a portion of a housing 504 may define an annular member 514. In some instances, the annular member 514 may be integral with the housing 504 (e.g., formed as part of the housing 504 during manufacture) and may comprise a section of the upper and lower portions 504A and 504B of the housing 504. In other instances, the annular member 514 may be welded or otherwise permanently attached to the housing 504. The annular member 514 defines an annular opening 522 that receives a collar 412 of a seal assembly 400. The seal assembly 400 may further comprise first and second end plates 416 and 418, in which the collar 412 and end plates 416 and 418 may be substantially similar in structure to the collar 12 and end plates 16 and 18 depicted in FIGS. 1-4. An outer diameter (not labeled) of the first end plate 416 may be greater than the diameter $D_{522}$ of the annular opening 522, such that the first end plate 416 is unable to be received in or pass through the annular opening 522. Because the annular member 514 is defined by the housing 504, in some examples, an outer diameter (not labeled) of the second end plate 418 may be substantially the same as an outer diameter (not labeled) of the collar 412, and the outer diameters of the collar 412 and the second end plate 418 may be slightly less than a diameter $D_{522}$ of the annular opening 522 defined by the annular member 514, such that the collar 412 and the second end plate 418 may be received in the annular opening 522. In other examples, the outer diameter of the second plate 418 may be substantially the same as the outer diameter of the first end plate 416. As described herein in detail with respect to the collars 12 and 12' in FIG. 7, the collar 412 may be fixedly coupled to the rotatable shaft 100 to allow rotation of the collar 412 with the shaft 100 and to prevent axial movement of the collar 412 with respect to the shaft 100. The seal assembly 400 may be used in conjunction with a second seal assembly, as shown in FIG. 7, or with a cover plate, as shown in FIG. 9, in which the second seal assembly may comprise any of the seal assemblies described herein.

With reference to FIGS. 1 and 4-7, the seal assembly 10 may be mounted to the shaft 100 and installed in the housing 104 as follows. One of the end plates, e.g., the second end plate 18, may be fixedly coupled to the second end surface 12-2 of the collar 12, as described herein. The collar 12 with the attached end plate 18 may be placed on and fixedly coupled to the shaft 100 by screwing the set screws (not shown) into the threaded apertures 12C formed in the collar 12 until the set screws contact or engage the outer surface 100-1 of the shaft 100, thereby fixing the collar 12 to the shaft 100 via friction. The annular member 14 may be placed around the shaft 100 and over the outer surface 12-3 of the collar 12 such that the annular member 14 is adjacent to the second end plate 18. The other end plate, e.g., the first end plate 16, may be placed around the shaft 100 and fixedly coupled to the first end surface 12-1 of the collar 12, as described herein. The upper portion 104A of the housing 104 may be separated from the lower portion 104B, and the shaft 100 with the installed seal assembly may be placed in the lower portion 104B of the housing 104 such that the annular member 14 is received in a lower half of the housing opening 108 defined by the lower portion 104B of the housing 104 and the locator pin 28 is received in the notch 112. The interaction between the locator pin 28 and the notch 112 may act as a stop to help position the seal assembly 10 correctly in the housing opening 108. The upper portion 104A of the housing 104 may then be attached to the lower portion 104B of the housing 104, such that the annular member 14 is received in an upper half of the housing opening 108 defined by the upper portion 104A of the housing 104. As shown in FIGS. 6 and 7, following installation, the first end plate 16 is located outside the housing 104, and the second end plate 18 is located inside the housing 104, with the collar 12 and the annular member 14 extending from outside the housing 104 to inside the housing 104. If desired, the second seal assembly 10' may be mounted to a second location on the shaft 100 and installed in the second housing opening 110 in a similar manner.

To remove the seal assembly 10, the upper portion 104A of the housing 104 may be separated from the lower portion 104B, and the shaft 100 with the seal assembly 10 may be removed from the housing 104. One of the end plates, e.g., the first end plate 16, may be removed from the collar 12, and the annular member 14 may be removed. The collar 12 may be uncoupled from the shaft 100 and removed (the second end plate 18 may be removed or may remain attached to the collar 12). If present, the second seal assembly 10' may be removed in a similar manner.

In configurations in which the housing is one part or it is not feasible to separate the upper and lower portions 104A and 104B of a split housing 104, it may be desirable to use the configuration shown in FIG. 10 in which the notch 312 that receives the locator pin 228 extends axially from outside the housing 304 toward the inside. In some examples, the seal assembly 200 may be coupled to the shaft 100, as described above with respect to the seal assembly 10. In other examples, the seal assembly 200 may be assembled separate from the shaft 100 by attaching one of the end plates, e.g., the second end plate 218, to the collar 212, placing the annular member 214 over the collar 212, and attaching the other end plate, e.g., the first end plate 216, to the collar 212. The seal assembly 200 may then be placed around the shaft 100. The locator pin 228 (i.e., the pipe plug) may be removed, i.e., unscrewed, from the aperture 214A in the annular member 214, and the annular member 214 may be rotated until the aperture 214A is aligned with one of the apertures 212C formed in the collar 212, as shown in FIG. 10. The set screw (not shown) located in the aperture 212C may be accessed via the aperture 214A and may be screwed into the aperture 212C until the set screw contacts or engages the outer surface 100-1 of the shaft 100. This process may be repeated with all of the apertures 212C and respective set screws until the collar 212 is fixedly coupled to the shaft 100 via friction.

With continued reference to FIG. 10, the shaft 100 with the seal assembly 200 may be inserted into the housing opening 308, with the second end plate 218 facing the housing 304. The outer diameters of the annular member 214 and the second end plate 218 may be substantially the same and may be configured such that the shaft 100 with the seal assembly 200 is able to be inserted into the housing opening 308 without the need to open the housing 304. The locator pin 228 may be received in the notch 312, with the interaction between the locator pin 228 and the notch 312 acting as a stop to position the seal assembly 200 correctly in the housing opening 308.

To remove the seal assembly 200 shown in FIG. 10, the shaft 100 with the seal assembly 200 may be at least partially removed from the housing 304 (e.g., by moving the shaft 100 axially away from the housing 304 or removing the upper portion 304A of the housing 304) so that the locator pin 228 is accessible. The locator pin 228 may be removed, i.e., unscrewed, from the aperture 214A, and the annular member 214 may be rotated until the aperture 214A is aligned with one of the apertures 212C formed in the collar 212, as shown in FIG. 10. The set screw coupling the collar 212 to the shaft 100 may be accessed via the aperture 214A and may be unscrewed from the shaft 100. This process may be repeated until all of the set screws have been unscrewed from the shaft 100 and the collar 212 is uncoupled from the shaft 100. The entire seal assembly 200 may then be removed from the shaft 100 without the need to first remove one of the end plates 216 or 218 and the annular member 214.

Seal assemblies in accordance with the present disclosure may be configured such that when the rotatable shaft 100 rotates, an interaction between the outer surface of the collar (i.e., the helical threads) and an inner surface of the annular opening creates or defines a rotary pump (i.e., a screw pump) with an axial flow direction extending from inside the housing (i.e., from inside the sealed chamber 118) to outside the housing. With reference to the first seal assembly 10 depicted in FIGS. 7 and 8A (all components except for the collar 12 are depicted in cross-section in FIG. 8A), the one or more helical threads 26 of the collar 12 may be configured such that when the rotatable shaft 100 rotates in a direction into the paper, an interaction between the outer surface 12-3 of the collar 12 and an inner surface of the annular opening 22 (i.e., the inner surface 14-4 of the annular member 14) creates a first rotary pump with a first axial flow direction indicated by arrow $DA_{12}$ (e.g., from right to left). With reference to the second seal assembly 10' depicted in FIGS. 7 and 8B (all components except for the second collar 12' are depicted in cross-section in FIG. 8B), the one or more second helical threads 26' of the second collar 12' may be configured such that when the rotatable shaft 100 rotates into the paper, an interaction between the second outer surface 12-3' of the second collar 12' and an inner surface of the second annular opening 22' (i.e., the second inner surface 14-4' of the second annular member 14') creates a second rotary pump with a second axial flow direction indicated by arrow $DA_{12'}$ (e.g., from left to right), in which the second axial direction $DA_{12'}$ is opposite the first axial direction $DA_{12}$. A directionality of the helical threads 26 and 26' may be used to control the direction of fluid movement, with the second helical threads 26' comprising an opposite directionality as compared to the helical threads 26 of the first seal assembly 10. For example, the one or more helical threads 26 of the collar 12 may comprise one of a right-handed thread or left-handed thread, and the one or more second helical threads 26' of the second collar 12' may comprise the other of the right-handed thread or the left-handed thread. In the examples shown in FIGS. 8A and 8B, the collar 12 comprises a left-handed thread, and the second collar 12' comprises a right-handed thread.

As shown in FIGS. 4 and 8A with respect to the first seal assembly 10, the second end surface 14-2 of the annular member 14 may be spaced apart from the inner face 18-1 of the second end plate 18 (e.g., by the second distance $D_2$) to define an inlet 30, and the first end surface 14-1 of the annular member 14 may be spaced apart from the inner face 16-1 of the first end plate 16 (e.g., by the first distance $D_1$) to define an outlet 32. The inlet 30 and the outlet 32 may extend circumferentially about an entirety of the respective end surfaces 14-1 and 14-2 of the annular member 14 and the adjacent sections of the inner faces 16-1 and 18-1 of the respective end plates 16 and 18. When the rotatable shaft 100 rotates, the collar 12 and the end plates 16 and 18 rotate with the shaft 100, and the annular member 14 is held stationary with respect to the shaft 100, the housing 104, the collar 12, and the end plates 16 and 18. Interaction between the one or more helical threads 26 formed on the outer surface 12-3 of the collar 12 and the inner surface 14-4 of the annular member 14 generates the rotary pump action effecting movement of contaminants and fluids in the first axial direction $DA_{12}$ that extends from the inlet 30 toward the outlet 32.

In particular, each of the one or more helical threads 26 comprises a corresponding helical groove 27 defined between neighboring threads 26, as shown in FIG. 8A. Each helical groove 27 may comprise an entrance 27A and an exit 27B. For example, a triple start thread would comprise three entrances and three exits equally spaced circumferentially about the end surfaces 12-1 and 12-2 of the collar 12 (only one entrance and one exit are visible in FIG. 8A; see FIG. 2). The entrance 27A may be located near the second end surface 12-2 of the collar 12 and may be in fluid communication with the inlet 30. The exit 27B may be located near the first end surface 12-1 of the collar 12 and may be in fluid communication with the outlet 32. Fluid entering the inlet 30 from inside the sealed chamber 118 would enter the one of the helical grooves 27 at the entrance 27A, and the action of the rotary pump would cause the fluid to move in the first axial direction $DA_{12}$ through the groove 27. Continued action of the rotary pump would cause the fluid to pass out of the groove 27 at the exit 27B and to be discharged from the seal assembly 10 at the outlet 32, after which the fluid enters an area 134 outside the housing 104.

Figure 12:
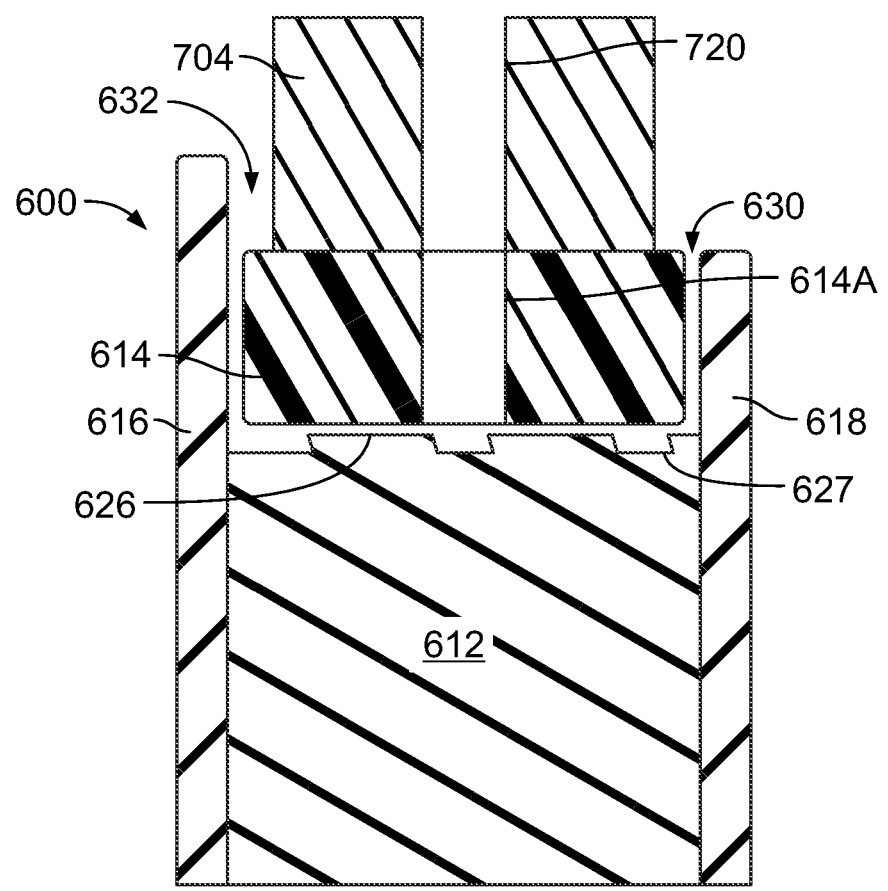
FIG. 12 is a detailed, cross-sectional view similar to FIGS. 8A and 8B of a further bearing assembly in accordance with the present disclosure.

The action of the rotary pump prevents contaminants 136 from entering the housing 104 through the outlet 32. One or more contaminants 136, such as water or other liquids, dirt, sand, wood pulp, black liquor, etc. may be present in the area 134 outside the housing 104 and may attempt to enter the outlet 32, i.e., by moving in a direction opposite to the first axial flow direction $DA_{12}$ of the rotary pump. The action of the rotary pump may counteract the ingress of the contaminants 136 and prevent them from entering the housing 104, as well as helping to expel any contaminants 136 present in, for example, the grooves 27. In some examples, the seal assembly 10 as shown in FIGS. 7 and 8A may comprise a "dry" seal that does not require the use of a barrier or flushing fluid to exclude and/or expel contaminants 136, i.e., little or no internal fluid from the sealed chamber 118 is present in the grooves 27 and/or outlet 32. In this example, the sealed chamber 118 may generally be unpressurized (i.e., at atmospheric pressure). In other examples, as shown in the detailed view of a portion of a seal assembly 600 in FIG. 12, a port 720 may be formed in a housing 704 and may be utilized to inject a viscous fluid (i.e., grease) either continuously or intermittently into a space between an annular member 614 and a collar 612 of the seal assembly 600. This fluid would provide a medium for the seal assembly 600 to pump and may serve as a flushing or barrier fluid that helps to ensure that the seal assembly 600, i.e., the grooves 627, are filled with fluid during operation and when shut down, i.e., when the rotatable shaft (not shown; see FIG. 7) is not rotating. The fluid may also help to reduce the flow of lower viscosity fluids (oil) from inside the housing 704 to the outside. In both examples, the helical threads 26 and 626 as shown in FIGS. 8A and 12 create an indirect path between the respective inlet 30, 630 and outlet 32, 632 that helps to prevent the ingress of contaminants 136 (not shown in FIG. 12).

With reference to the second seal assembly 10' shown in FIGS. 7 and 8B, the one or more second helical threads 26' of the second collar 12' may likewise be configured such that when the rotatable shaft 100 rotates, an interaction between the second outer surface 12-3' of the second collar 12' and the second inner surface of the second annular opening 22' (i.e., the second inner surface 14-4' of the second annular member 14') creates a second rotary pump action effecting movement of contaminants and fluids in the second axial flow direction $DA_{12'}$ extending from inside the housing 104 to outside the housing 104, in which the second axial flow direction $DA_{12'}$ is opposite to the first axial flow direction $DA_{12}$. The third and fourth end surfaces 14-1' and 14-2' of the second annular member 14' may be spaced apart from the respective third and fourth inner faces 16-1' and 18-1' of the third and fourth end plates 16' and 18' to define a respective second inlet 30' and second outlet 32'. The second inlet 30' and the second outlet 32' may extend circumferentially about an entirety of the respective end surfaces 14-1' and 14-2' of the second annular member 14' and the adjacent sections of the inner faces 16-1' and 18-1' of the respective end plates 16' and 18'. When the rotatable shaft 100 rotates, the second collar 12' and the end plates 16' and 18' rotate with the shaft 100, and the second annular member 14' is held stationary with respect to the shaft 100, the housing 104, the second collar 12', and the end plates 16' and 18'. An interaction between the one or more second helical threads 26' formed on the outer surface 12-3' of the second collar 12' and the inner surface 14-4' of the annular member 14' generates the second rotary pump with the second axial flow direction $DA_{12'}$ extending from the second inlet 30' toward the second outlet 32'.

Similar to the helical threads 26 of the first collar 12, each of the one or more second helical threads 26' may comprise a corresponding helical groove 27' defined between neighboring threads 26', as shown in FIG. 8B. Each helical groove 27' may comprise an entrance 27A' and an exit 27B'. The entrance 27A' may be located near the fourth end surface 12-2' of the second collar 12' and may be in fluid communication with the second inlet 30'. The exit 27B' may be located near the third end surface 12-1' of the second collar 12' and may be in fluid communication with the outlet 32'. Fluid entering the inlet 30' from inside the sealed chamber 118 would enter one of the helical grooves 27' at the entrance 27A', and the action of the rotary pump would cause the fluid to move in the second axial flow direction $DA_{12'}$ through the groove 27' toward the exit 27B', where the fluid is discharged from the second seal assembly 10' at the outlet 32' and enters the area 134 outside the housing 104.

The action of the second rotary pump helps to prevent contaminants 136 from entering the housing 104 through the outlet 32' (i.e., in a direction opposite to the second axial flow direction $DA_{12'}$ of the second rotary pump). As described herein in detail with respect to the seal assemblies 10 and 600 in FIGS. 8A and 12, The second seal assembly 10' may operate as a "dry" seal, as described with respect to the first seal assembly 10 in FIG. 8A, or may be used in conjunction with an intermittent or continuous supply of a fluid, as described with respect to FIG. 12.

Any of the seal assemblies described herein may optionally include one or more additional seals, such as the O-ring seals 238 and 240 depicted in FIG. 10. The O-ring seals 238 and 240 may help to prevent contaminants from entering the housing at, for example, an interface (not labeled) between an outer surface of the shaft and the inner surface of the collar and/or an interface (not labeled) between the outer surface of the annular member and the housing opening. Alternatively, or in addition, any of the seal assemblies described herein may also be used in conjunction with one or more conventional seals, such as a labyrinth seal (not shown).

Although exemplary dimensions are provided herein for the inner diameter, outer diameter, axial length, etc. of some components of the seal assemblies, it is understood that the components of the seal assemblies may comprise any suitable dimension needed to provide the described relationships and/or interactions between the components of the seal assembly and/or between the seal assembly and the housing in which the seal assembly is received. In addition, although the components of the seal assemblies described herein are depicted as comprising a single part, it is understood that one or more of the components (e.g., the collar, the annular member, and/or the end plates) could comprise two or more parts, such as an upper and lower portion, to simplify assembly and removal. Furthermore, while the end plates are depicted herein as separate components, one or both of the end plates may optionally be formed as part of the collar.

As described herein, seal assemblies in accordance with the present disclosure harness the energy of a rotating shaft to generate a seal that excludes and/or expels contaminants attempting to enter the housing. When the seal assembly is installed, helical threads on the outer surface of the collar and an inner surface of a corresponding annular member define a rotary pump (i.e., a screw pump) effecting an axial flow direction extending from inside the housing to outside the housing. The action of the rotary pump serves to expel contaminants attempting to enter the housing, i.e., contaminants attempting to move in a direction opposite to the axial flow direction of the rotary pump. This design may help to increase the useful life of the housing and components, e.g., bearings, within the housing, particularly in high contamination environments where conventional seals may wear out too quickly or be overwhelmed. Seal assemblies in accordance with the present disclosure may be configured to fit a variety of types and sizes of shafts and housings and may be configured to allow for easy installation and removal, as described herein. The seal assembly design includes a minimum of operational components and is not dependent on tight tolerances and precision machined fits to function properly. The presently disclosed seal assembly design may also be particularly useful in situations involving shaft deflection. Shaft deflection may interfere with and/or damage conventional contact or labyrinth seals. Seal assemblies in accordance with the present disclosure are designed to operate with a small amount of clearance between the stator member, i.e., the collar, and the rotor member, i.e., the annular member, such that shaft deflection is less likely to damage the seal assembly and/or interfere with the ability of the seal assembly to effectively exclude and/or expel contaminants.

Figure 13:
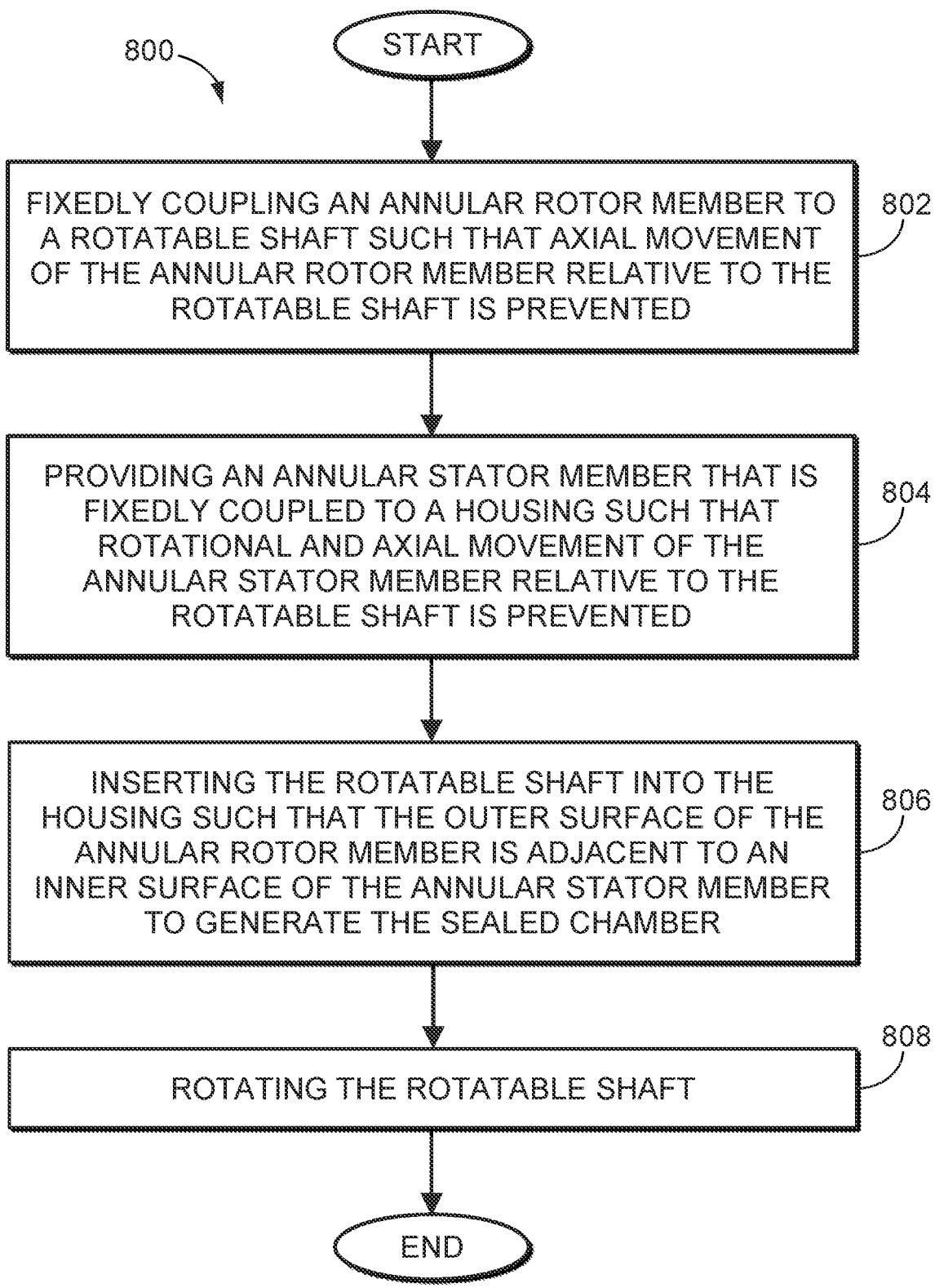
FIGS. 13 and 14 are flow diagrams of methods for preventing contamination of a sealed chamber, in accordance with the present disclosure.
Figure 14:
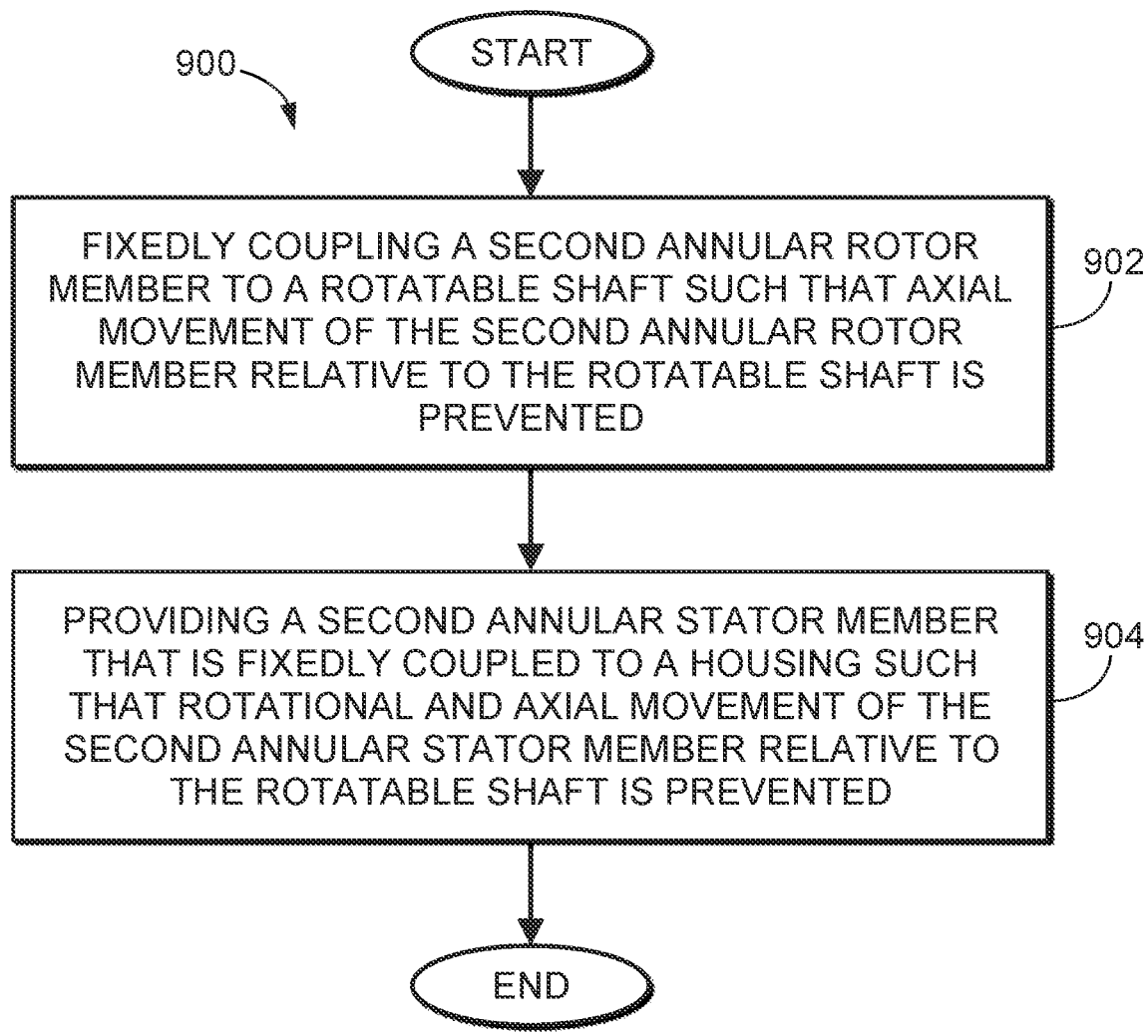

FIGS. 13 and 14 are flowcharts of exemplary methods 800 and 900 for preventing contamination of a sealed chamber, in accordance with the present disclosure. Although reference is made primarily to the seal assemblies 10 and 10' and the housing 104 shown in FIGS. 1-7, 8A, and 8B, it is understood that the disclosed methods may be used with any of the configurations described herein.

With reference to FIG. 13, the method 800 begins at Step 802 with fixedly coupling an annular rotor member to a rotatable shaft such that axial movement of the annular rotor member relative to the rotatable shaft is prevented, in which an outer surface of the annular rotor member comprises one or more helical threads. As shown in FIGS. 4 and 7, the annular rotor member may comprise, for example, the collar 12, which may be fixedly coupled to the rotatable shaft 100 as described herein in detail. The outer surface 12-3 of the collar 12 may comprise one or more helical threads 26.

The method 800 continues at Step 804 with providing an annular stator member that is fixedly coupled to a housing such that rotational and axial movement of the annular stator member relative to the rotatable shaft is prevented. As shown in FIGS. 4 and 7, the annular stator member may comprise, for example, the annular member 14, which may be fixedly coupled to the housing 104 as described herein in detail. In other examples, as shown in FIG. 11, the annular member 514 may be defined by a portion of the housing 504. The housing may comprise a bearing housing or a machine or equipment housing, as described herein.

At Step 806, the rotatable shaft is inserted into the housing such that the outer surface of the annular rotor member is adjacent to an inner surface of the annular stator member to generate the sealed chamber. With reference to FIG. 7, the rotatable shaft 100 may be inserted into the housing 104 such that the outer surface 12-3 of the collar 12 is adjacent to the inner surface 14-4 of the annular member 14, which may generate the sealed chamber 118 in the housing 104. As shown in FIG. 11, when a portion of the housing 504 defines the annular member 514, the rotatable shaft 100 may similarly be inserted into the housing 504 such that the outer surface (not labeled) of the collar 412 is adjacent to the inner surface (not labeled) of the annular member 514.

The method 800 continues at Step 808 with rotating the rotatable shaft, in which the one or more helical threads are configured such that an interaction between the outer surface of the annular rotor member and the inner surface of the annular stator member generates a rotary pump comprising a first axial flow direction extending from inside the housing to outside the housing and prevents material from entering the sealed chamber. The method 800 may conclude following Step 808. With reference to FIGS. 7 and 8A, the rotatable shaft 100 may be coupled to a motor (not shown) that causes the shaft 100 to rotate, and the one or more helical threads 26 of the collar 12 may be configured such that an interaction between the outer surface 12-3 of the collar 12 and the inner surface 14-4 of the annular member 14 generates a rotary pump action effecting movement of contaminants, fluids and the like in a first axial flow direction $DA_{12}$ extending from inside the housing 104 to outside the housing 104 and prevents material, e.g., contaminants 136, from entering the sealed chamber 118.

FIG. 14 illustrates additional optional steps that may be performed during or after the method 800 depicted in FIG. 13. With reference to FIG. 14, the method 900 begins at Step 902 with fixedly coupling a second annular rotor member to the rotatable shaft such that axial movement of the second annular rotor member relative to the rotatable shaft is prevented, in which an outer surface of the second annular rotor member comprises one or more second helical threads. As shown in FIG. 7, the second annular rotor member may comprise, for example, the second collar 12', which may be fixedly coupled to the rotatable shaft 100 as described herein in detail. The outer surface 12-3' of the second collar 12' may comprise one or more second helical threads 26'.

The method 900 continues at Step 904 with providing a second annular stator member that is fixedly coupled to the housing such that rotational and axial movement of the second annular stator member relative to the rotatable shaft is prevented. The method 900 may conclude following Step 904. As shown in FIG. 4, the second annular stator member may comprise, for example, the second annular member 14', which may be fixedly coupled to the housing 104 as described herein in detail. As shown in FIG. 7, when the rotatable shaft 100 is inserted into the housing 104, the outer surface 12-3' of the second collar 12' is adjacent to the inner surface 14-4' of the second annular member 14', which may generate the sealed chamber 118 in the housing 104. In other examples, as shown in FIG. 11, the second annular member 514 may be defined by a portion of the housing 504, and when the rotatable shaft 100 is inserted into the housing 504, the outer surface (not labeled) of the collar 412 is adjacent to the inner surface (not labeled) of the annular member 514. With reference to FIGS. 7 and 8B, the rotatable shaft 100 may be coupled to a motor (not shown) that causes the shaft 100 to rotate, and the one or more second helical threads 26' of the second collar 12' may be configured such that when the rotatable shaft 100 rotates, an interaction between the outer surface 12-3' of the second collar 12' and the inner surface 14-4' of the second annular member 14' generates a second rotary pump comprising a second axial flow direction $DA_{12'}$ extending from inside the housing 104 to outside the housing 104 and prevents material, e.g., contaminants 136, from entering the sealed chamber 118. The second axial flow direction $DA_{12'}$ is opposite the first axial flow direction $DA_{12}$.

As used throughout, ranges are used as a short hand for describing each and every value that is within the range, including all subranges therein.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for preventing contamination of a sealed chamber, the method comprising:
   fixedly coupling a first annular rotor member and a second annular rotor member to a rotatable shaft such that rotational and axial movement of the first and second annular rotor members relative to the rotatable shaft are prevented, wherein an outer surface of each of the first and second annular rotor members comprises one or more helical threads;
   providing a first annular stator member and a second annular stator member that are fixedly coupled to a housing configured to receive the rotatable shaft;
   inserting the rotatable shaft into the housing such that the outer surface of the first annular rotor member is adjacent to an inner surface of the first annular stator member and the outer surface of the second annular rotor member is adjacent to an inner surface of the second annular stator member to generate the sealed chamber, wherein:

the one or more helical threads of the first annular rotor member are configured such that an interaction between the outer surface of the first annular rotor member and the inner surface of the first annular stator member generates a first rotary pump comprising a first flow direction extending from inside the housing to outside the housing along a rotation axis of the rotatable shaft, the one or more helical threads of the second annular rotor member are configured such that an interaction between the outer surface of the second annular rotor member and the inner surface of the second annular stator member generates a second rotary pump comprising a second flow direction extending from inside the housing to outside the housing along the rotation axis; and rotating the rotatable shaft about the rotation axis such that the first rotary pump pumps materials in the first flow direction and the second rotary pump pumps materials in the second flow direction opposite to the first flow direction along the rotation axis.

2. The method of claim 1, wherein the one or more helical threads of the first annular rotor member comprise one of a right-handed thread or a left-handed thread, and wherein the one or more helical threads of the second annular rotor member comprise the other of the right-handed thread or the left-handed thread.

3. The method of claim 1, wherein a portion of the housing defines the first and second annular stator members.

4. The method of claim 1, wherein each of the one or more helical threads comprise two or more threads defining a multi-start thread.

5. The method of claim 1, wherein:

the first annular rotor member has an opening having a first inner diameter configured to receive a first portion of the rotatable shaft;

the second annular rotor member has an opening having a second inner diameter configured to receive a second portion of the rotatable shaft; and the second inner diameter is different than the first inner diameter.

6. The method of claim 5, wherein the opening of the first annular rotor member comprises an O-ring configured to seal against an outer surface of the first portion of the rotatable shaft to prevent contaminants from entering the sealed chamber at an interface between the opening of the first annular rotor member and the outer surface of the first portion of the rotatable shaft.

7. The method of claim 5, wherein the opening of the second annular rotor member comprises an O-ring configured to seal against an outer surface of the second portion of the rotatable shaft to prevent contaminants from entering the sealed chamber at an interface between the opening of the second annular rotor member and the outer surface of the second portion of the rotatable shaft.

\* \* \* \* \*